Patented Feb. 24, 1953

2,629,659

UNITED STATES PATENT OFFICE 2,629,659

PROCESS OF HARDENING GELATINO SILVER HALIDE EMULSIONS

Fritz W. H. Mueller, Binghamton, N. Y., assignor to General Aniline & Film Corporation, New York, N. Y., a corporation of Delaware No Drawing. Application December 7, 1948, Serial No. 64,052

4 Claims. (Cl. 95—7)

This invention relates to the hardening of gelatin, and especially to the hardening of photographic gelatin and gelatino silver-halide emulsions to yield compositions having an appreciable increase in melting point and good stability on aging with respect to fog, speed, and gradation.

In the preparation of photographic gelatin dispersions and gelatino silver-halide emulsions, it has been the practice to treat the dispersions and emulsions, prior to coating, with a hardening agent so as to reduce the tendency of the gelatin to soften, or to distend during processing of the photographic material containing the gelatin, particularly at temperatures higher than the temperature specified for processing the particular photographic material. Compounds which have been used for hardening gelatin as such or in silver-halide emulsions are formaldehyde, hydroxy aldehydes, acrolein, glyoxal, and derivatives thereof, and mixtures of an aliphatic aldehyde with an aromatic compound containing at least one nuclear hydroxy substituent group such as phenol, resorcinol, resorcylic aldehyde, and the like. Although formaldehyde and hydroxy aldehydes are satisfactory as hardening agents, these compounds possess the undesirable property of producing excessive fog, densitization, or flattening of gradation in the processed film. Aliphatic aldehydes, with an aromatic compound containing at least one nuclear hydroxy substituent group, induce some increase in the melting point. They fail, however, to give both an appreciable increase in the melting point and good stability upon aging in respect to fog, speed, and gradation.

In United States Patent 2,180,335, hydroxy ketones, such as acetol, dihydroxyacetone, 3-ketobutane-1-ol, propionyl-carbinol, and the like, are suggested as hardeners for gelatin. The specification of this patent, page 1 column 1, lines 54 et seq., explains that ketones containing one hydroxy group are inferior to those containing several hydroxy groups in their molecule as hardening agents for gelatin and gelatinous silver-halide emulsions. The hydroxy ketones disclosed in this patent increase the melting point of silver-halide emulsions only to a moderate degree.

In United States Patent 2,165,421, it is suggested that the stability of emulsions hardened by formaldehyde, and other aldehydes, can be improved by the use of hydroxy benzenes, such as resorcinol, phloroglucinol, resorcylic aldehyde, and the like. However, even though this treatment does lead to some improvement in the stability of the photographic properties on aging, it is not entirely adequate, especially with high speed emulsions. In other words, although aliphatic aldehydes with hydroxy benzenes induce an increase in the melting point, they invariably cause loss in speed and contrast so that one has to make compromises between hardening and speed. Moreover, by the use of such a combination, only relatively little hardening can be achieved without causing deleterious effects in the photographic characteristics of the emulsion.

It is an object of the present invention to provide a photographic gelatin or a gelatino silver-halide emulsion having an appreciably higher melting point and much better stability on aging than gelatin or gelatino silver-halide emulsions per se.

Another object is to provide gelatin layers and gelatino silver-halide emulsion layers in which the gelatin is substantially devoid of the phenomenon known as "after-hardening."

A further object is to provide a gelatino silver-halide emulsion which will not fog on storage.

A further object is to provide a gelatino silver-halide emulsion which will be resistant to relatively high processing temperatures without melting, reticulating, and fogging.

A still further object is to provide hardened gelatino silver-halide emulsions which will not lose speed and gradation on aging.

Other objects will appear hereinafter.

The foregoing objects are accomplished, according to the present invention, by incorporating into the gelatin or gelatino silver-halide emulsion, a keto alcohol with other compounds which alone possess little or no hardening effect upon gelatin or gelatino silver-halide emulsions, but in conjunction with the keto alcohol accelerate the hardening action with apparent elimination of "after-hardening," and also inhibit the tendency of the photographic material to fog and to lose speed and contrast on aging.

The keto alcohols which may be utilized are characterized by a structure corresponding to the following general formula:

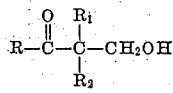

wherein R represents a low molecular weight alkyl group, e. g., methyl, ethyl, etc., $R_1$ represents either hydrogen or a methylol ($CH_2OH$) group, and $R_2$ represents either hydrogen or a methyl group.

As examples of suitable keto alcohols, the following are illustrative:

(1) $$CH_3-CO-CH_2-CH_2OH$$
3-ketobutanol
Beilstein, 4th ed., vol. 1, 1st suppl., p. 421

(2) $$CH_3-CO-\underset{\underset{CH_3}{|}}{CH}-CH_2OH$$
2-methyl-3-ketobutanol (3) $$CH_3-CO-\underset{\underset{CH_3}{|}}{\overset{\overset{CH_2OH}{|}}{C}}-CH_2OH$$
2,2-dimethylol-3-butanone (4) $$C_2H_5-CO-\underset{\underset{CH_3}{|}}{CH}-CH_2OH$$
2-methyl-3-ketopentanol The foregoing compounds are disclosed in the literature and a general method for their preparation is found in United States Patents 981,668 and 989,993, British Patent 381,686, and J. S. C. I. 29, 719 (1910) and 30, 240 (1911).

The compounds which alone possess little or no hardening effect on gelatin or gelatino silverhalide emulsions, and which may be added in conjunction with the keto alcohol, are 2,4-dihydroxybenzaldehyde (resorcylic aldehyde), 1,3-benzenediol (resorcinol), and phloroglucinol.

The function of 2,4-dihydroxybenzaldehyde in the mixture is to boost or accelerate the hardening action of the keto alcohol. When resorcinol or phloroglucinol is added to this combination, the optimum in hardening as well as in photographic properties is obtained. The increase in hardening is not accomplished by any tendency for the gelatin or emulsion to undergo the phenomenon of "after-hardening." The results obtained with the keto alcohols in admixture with the 2,4-dihydroxybenzaldehyde are greatly improved if there also be employed resorcinol. This compound does not detract in the slightest from the hardening effect obtained with the other components, and, rather surprisingly, in cooperation with said other ingredients, confers upon the final sensitized emulsions a very excellent stability on aging with respect to fog, speed, and contrast. While the invention contemplates the utilization of the keto alcohols with 2,4-dihydroxybenzaldehyde to effect hardening while substantially avoiding the phenomenon of "after-hardening," it likewise contemplates the employment, with the keto alcohols, 2,4-dihydroxybenzaldehyde and resorcinol or phloroglucinol together. Inasmuch as best results are obtained when all three components are employed, the use of the same represents the preferred embodiment of the invention.

It is to be noted that from the large class of aromatic dihydroxyaldehydes, 2,4-dihydroxybenzaldehyde is the only one to accelerate the hardening effect of the keto alcohols without impairing the photographic characteristics of the emulsions, and from the large class of aromatic hydroxy compounds containing at least 1 nuclear hydroxy group, resorcinol was found to be the only one, when in an admixture with a keto alcohol and 2,4-dihydroxybenzaldehyde, to act as a stabilizing agent so as to impart excellent additional stability to the emulsion with respect to fog, speed, and gradation.

While the exact amount of the keto alcohols in admixture with 2,4-dihydroxybenzaldehyde and/or resorcinol may be varied within wide limits and with due regard to the particular type of gelatin dispersion employed, in general, amounts of the keto alcohols ranging from 0.05% to 2.5% based on the dry weight of gelatin in the dispersion are preferred. The amount of total polyhydroxybenzene to be added may also vary from 0.05% to 5% based on the dry weight of gelatin. In these amounts, effective hardening is obtained without "after-hardening," i. e., the melting point of the gelatin does not vary with time or with long periods of storage prior to actual use and processing of the photographic material provided with such a layer.

In hardening gelatin emulsions which are slightly alkaline, i. e., emulsions having a pH greater than 7, generally between 7 and 8.5, the exact amounts of the keto alcohols, 2,4-dihydroxybenzaldehyde, and resorcinol or phloroglucinol may also be varied within wide limits, depending largely upon the desired degree of hardening, stabilizing effect, and contrast. In general, the amounts of the keto alcohols may vary from 1 to 5 grams, the amount of 2,4-dihydroxybenzaldehyde may vary from 0.1 to 5 grams, and the amount of resorcinol or phloroglucinol may vary from 1 to 10 grams per 10 kilograms of emulsion containing 8–10% gelatin.

Where it is desired to increase the speed and contrast of a silver-halide emulsion, I prefer to use resorcinol in conjunction with the keto alcohol and 2,4-dihydroxybenzaldehyde. It is to be understood, however, that these emulsions may also be hardened by mixing therewith prior to coating the keto alcohol in combination with 2,4-dihydroxybenzaldehyde. In the latter case the melting point of the gelatin rises appreciably without the attendant serious loss of photographic characteristics.

While the following examples describe in detail the methods for accomplishing the aforestated objects, it is to be understood that they are given merely for the purpose of illustration and are not to be construed as limiting the scope of the invention.

Example I

To 1 liter of a melted aqueous photographic silver-halide emulsion, containing 8–10% of gelatin, 20 mls. of a 1% aqueous solution of 3-ketobutanol and 40 mls. of a 2% aqueous solution of 2,4-dihydroxybenzaldehyde were added at a temperature of 40° C. A glass plate was coated with a thin layer of this emulsion and dried at room temperature. After a 4-day oven test, the melting point was 46° C., as compared with a melting point of 35° C. for the untreated emulsion, and remained substantially unchanged after a period of several months. Similar stability on aging was obtained with respect to photographic characteristics.

Example II

To 1 liter of a melted aqueous photographic silver-halide emulsion containing 8–10% of gelatin, 50 mls. each of a 0.5% aqueous solution of 2-methyl-3-ketopentanol, and 1% aqueous solution of 2,4-dihydroxybenzaldehyde and resorcinol were added at a temperature of 40° C. A glass plate was coated with a thin layer of this emulsion and dried at room temperature. After a 4-day oven test, the melting point was 53° C., as compared with a melting point of 35° C. for the untreated emulsion, and remained substantially unchanged after a period of several months. Similar stability on aging was obtained with respect to photographic characteristics.

Example III

This example graphically illustrates the results of incorporating 2-methyl-3-ketobutanol, 2,4-dihydroxybenzaldehyde and resorcinol in an X-ray emulsion containing 8–10% of gelatin, whereby the melting is substantially increased without any effect on fog. All the parts are in per cent based on the dry weight of the gelatin in the emulsion.

| 2-methyl-3-ketobutanol (.5%) | 2,4-dihydroxy-benzaldehyde (1%) | resorcinol (1%) | melting point in °C. (after 2-day oven test) |
|---|---|---|---|
| Cc. | Cc. | Cc. | Degrees |
| 0 | 0 | 0 | 33 |
| 50 | 25 | 100 | 46 |
| 50 | 50 | 75 | 55.5 |
| 50 | 75 | 50 | 53 |
| 50 | 100 | 25 | 51 |
| 50 | 125 | 0 | 52 |

From the foregoing examples, it is clearly apparent that my invention is not only applicable to the preparation of photographic silver-halide emulsions of satisfactory hardening properties, but also to the preparation of gelatin dispersions and dispersions of gelatin substitutes, which are normally capable of being hardened with formaldehyde, especially those which are and have been used in the preparation of various coatings or layers on paper, cloth, film, glass, and other surfaces.

I claim:

1. A photo-sensitive element comprising a support and a gelatino silver-halide emulsion coated thereon, said emulsion containing as hardening means, 2,4 - dihydroxybenzaldehyde, resorcinol, and a keto alcohol characterized by the following general formula:

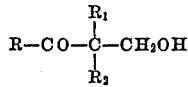

wherein R represents a member selected from the class consisting of methyl and ethyl groups, $R_1$ represents a member selected from the class consisting of hydrogen and methylol, and $R_2$ represents a member selected from the class consisting of hydrogen and methyl.

2. A photo-sensitive element comprising a support and a gelatino silver-halide emulsion coated thereon, said emulsion containing as hardening means 2,4 - dihydroxybenzaldehyde, resorcinol, and a keto alcohol of the following formula:

$$CH_3-CO-CH_2-CH_2OH$$

3. A photo-sensitive element comprising a support and a gelatino silver-halide emulsion coated thereon, said emulsion containing as hardening means 2,4 - dihydroxybenzaldehyde, resorcinol, and a keto alcohol of the following formula:

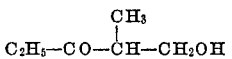

4. A photo-sensitive element comprising a support and a gelatino silver-halide emulsion coated thereon, said emulsion containing as hardening means 2,4 - dihydroxybenzaldehyde, resorcinol, and a keto alcohol of the following formula:

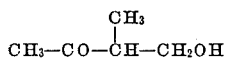

FRITZ W. H. MUELLER.

REFERENCES CITED

The following references are of record in the file of this patent:

UNITED STATES PATENTS

| Number | Name | Date |
|---|---|---|
| 2,165,421 | Sheppard | July 11, 1939 |
| 2,180,335 | Brunken | Nov. 21, 1939 |
| 2,494,055 | Orkin | Jan. 10, 1950 |

FOREIGN PATENTS

| Number | Country | Date |
|---|---|---|
| 504,378 | Great Britain | Apr. 24, 1939 |

OTHER REFERENCES

Mees, The Theory of the Photographic Process, pub. by The MacMillan Co., New York, August 1942, pages 118–121.